(12) United States Patent
Smith

(10) Patent No.: US 7,577,717 B2
(45) Date of Patent: Aug. 18, 2009

(54) SYSTEM FOR SELECTING AND PLAYING JUKEBOX TRACKS

(75) Inventor: Adam James Smith, London (GB)

(73) Assignee: C-Burn Systems Ltd, London (GB)

(*) Notice: Subject to any disclaimer, the term of this patent is extended or adjusted under 35 U.S.C. 154(b) by 649 days.

(21) Appl. No.: 10/735,578

(22) Filed: Dec. 11, 2003

(65) Prior Publication Data

US 2005/0044254 A1 Feb. 24, 2005

Related U.S. Application Data

(63) Continuation of application No. PCT/GB02/02638, filed on Jun. 11, 2002.

(30) Foreign Application Priority Data

Jun. 11, 2001 (GB) ................................. 0114177.9
Mar. 22, 2002 (GB) ................................. 0206823.7

(51) Int. Cl.
*G06F 15/16* (2006.01)
(52) U.S. Cl. ...................................... 709/218; 217/219
(58) Field of Classification Search ................. 709/226, 709/229, 231, 218; 725/63
See application file for complete search history.

(56) References Cited

U.S. PATENT DOCUMENTS

| | | | | |
|---|---|---|---|---|
| 5,481,509 A | * | 1/1996 | Knowles | ...................... 386/117 |
| 5,911,043 A | | 6/1999 | Duffy et al. | |
| 2001/0053996 A1 | * | 12/2001 | Atkinson | ...................... 705/14 |
| 2002/0032752 A1 | * | 3/2002 | Gold et al. | ................... 709/218 |
| 2002/0133562 A1 | * | 9/2002 | Newnam et al. | ............ 709/216 |
| 2002/0194264 A1 | * | 12/2002 | Uchiyama et al. | ........... 709/203 |
| 2007/0094698 A1 | * | 4/2007 | Bountour et al. | ............ 725/132 |

FOREIGN PATENT DOCUMENTS

| | | |
|---|---|---|
| WO | WO 99/22346 A1 | 5/1999 |
| WO | WO 01/28222 A2 | 4/2001 |
| WO | WO 01/28222 A3 | 4/2001 |
| WO | WO 01/39577 A1 | 6/2001 |

OTHER PUBLICATIONS

International Search Report of International Application No. PCT/GB02/02638, 3 pp.(2003).

* cited by examiner

*Primary Examiner*—Jeffrey Pwu
*Assistant Examiner*—Abdelnabi O Musa
(74) *Attorney, Agent, or Firm*—Lahive & Cockfield, LLP; Anthony A. Laurentano

(57) ABSTRACT

A system for playing audio and/or video tracks in a public place in response to requests made by people, in which a jukebox is situated in the public place, the jukebox providing a plurality of audio and/or video tracks from which a selection of tracks to be played in the public place can be made by people in the public place, the jukebox being adapted to register requests for tracks to be played and to store requests whilst other requested tracks are played, characterized in that the jukebox registers a request in response to information transmitted by a person using a mobile communications device which is adapted to transmit text, data or speech over a wireless communications network, the transmitted information being processed automatically to provide data instructions which register the request.

4 Claims, 2 Drawing Sheets

SYSTEM FOR SELECTING AND PLAYING JUKEBOX TRACKS

RELATED APPLICATIONS

This application is a continuation of International Application No. PCT/GB02/02638, filed Jun. 11, 2002, which claims priority to Great Britain Patent Application No.: 0206823.7, filed on Mar. 22, 2002, and also to Great Britain Patent Application No.: 0114177.9, filed on Jun. 11, 2001, the contents of each of which are incorporated by reference herein.

FIELD OF THE INVENTION

The present invention relates to an automated system for remote product or service selection. The system is particularly suitable for requesting that audio and/or video tracks be played in a public place, in the manner of a jukebox, but has many other applications.

Jukeboxes are commonly provided in bars and similar public places to allow customers to play music tracks of their choice. Some jukeboxes also display video images. Traditional jukeboxes are generally manually operated and the customer requests the track or tracks to be played from a list of available tracks by keying in a code. These jukeboxes can be quite bulky and take up valuable "front of house" space inside of the establishment in which they are installed. Furthermore, as the jukeboxes are subjected to continued public use, they are subjected to wear and tear and as a result may be damaged. As traditional jukeboxes are generally coin operated, or sometimes credit or debit card operated, the person wishing to play a track is required to go to the console, insert a coin or a card, and make their selection. This is inconvenient if, for example, the person is sitting at a table in a crowded establishment. The area around the console may also become congested and this may discourage people from using the jukebox.

BACKGROUND OF THE INVENTION

There are known arrangements in which radio listeners or television viewers can use telephones to call specified numbers to "vote" for a preferred track from a short list of tracks. Tracks achieving the highest number of votes will be played. However, such systems are not "jukeboxes". For example, they rely upon a voting arrangement and individual users have no guarantee that a requested track will be played. Tracks are only played during the course of a particular programme, and frequently will be played only once during that programme. Using a jukebox in a bar or other public place, a popular track may be played on a number of occasions during the course of a day in accordance with requests made at various times. Furthermore, the tracks available for selection are determined by the TV or radio channel and cannot be chosen having regard to the type of clientele. Customers may find that they are forced to watch and listen to tracks which do not correspond to their tastes, and that they cannot select tracks of the type they want.

There are also known arrangements in which viewers of a television channel have access to a list of music videos which are available. The available tracks and their codes may scroll across the screen, and may also be available on teletext or in a magazine. To select a particular video, a viewer uses a telephone to call a premium number—for which there is a charge—and then use the telephone keypad to input the number. It is then necessary to wait for the video to play on the channel, and this can take a considerable time in some case. Broadcasting such a channel in a public place would not be equivalent to a local jukebox, because the number of potential users of the system, possibly across several countries, would be far greater than the number of customers in a public place such as a bar. There could be significant delays before a track is shown. In addition, the tracks available for selection are determined by the TV channel and cannot be chosen having regard to the type of clientele. Customers may find that they are forced to watch and listen to video tracks which do not correspond to their tastes, and that they cannot select tracks of the type they want. Essentially these are systems for use by individuals at home, rather than for entertaining people in a public place.

SUMMARY OF THE INVENTION

Viewed from one aspect, the present invention provides a system for playing audio and/or video tracks in a public place in response to requests made by people, in which a jukebox is situated in the public place, the jukebox providing a plurality of audio and/or video tracks from which a selection of tracks to be played in the public place can be made by people in the public place, the jukebox being adapted to register requests for tracks to be played and to store requests whilst other requested tracks are played, characterised in that the jukebox registers a request in response to information transmitted by a person using a mobile communications device which is adapted to transmit text, data or speech over a wireless communications network, the transmitted information being processed automatically to provide data instructions which register the request.

Viewed from another aspect there is provided an automated jukebox for playing a requested audio and/or video track in a public place, the jukebox comprising a receiving device for receiving information concerning a request for a track to be played in the public place, a processing device for processing the received information, a storage device for storing requests whilst other requested tracks are played, and a playback device for playing requested tracks in the public place, characterised in that the receiving device is adapted to receive information that has been transmitted from a mobile communications device over a wireless communications network, and the processing device is adapted to automatically process the data to obtain instructions which register the request.

The expression "audio and/or video track" encompasses a wide range of audio and/or visual content, including multimedia based information as well as conventional music audio tracks with or without accompanying video material.

The wireless communications network is preferably a mobile telephone network, such as a cellular or satellite telephone network, and could use a wide range of technologies, including Global System for Mobile Communications (GSM), General Packet Radio Service (GPRS), Wireless Application Protocol (WAP), Universal Mobile Telecommunications System (UMTS), and technologies yet to be introduced. With GPRS and other advanced systems there can be a permanent data connection to the network, making it quicker to transmit data. Short range communications systems such as Bluetooth, which is incorporated in some mobile telephones and Personal Digital Assistants (PDA's) may also be used.

The route by which the information transmitted by the mobile communications device reaches data processing equipment for processing the information may take a number of forms. In a preferred embodiment, a system such as Short Message Service (SMS) text messaging on a cellular mobile telephone network is used to transmit a request to the jukebox. Suitable SMS enabled mobile telephones, which may incorporate or be incorporated in mobile data processing apparatus having other functions, are widely available. Thus, by means of a mobile telephone a user sitting in an establishment can select a track without having to go to a console. The owner of the establishment only has to provide a list of tracks which the user can consider, and does not have to provide a special remote control or the like which could be stolen or damaged, people will use their own mobile telephones or personal digital assistants (PDA's) to send SMS messages.

Other systems for transmitting data could use e-mail, keystrokes which are transmitted once a connection is made, or even specific numbers to dial. However, the preferred manner of implementing the various inventive aspects is to enable a user to compose an alphanumeric message (which may consist only of numerals or letters or combine both) which is sent to a specific address (for example a telephone number). This is more convenient and more versatile than requiring the user to connect to call different numbers or to connect to a number and then input keystrokes.

It is important for these aspects of the invention that the system provides at least some facilities of a conventional jukebox. The jukebox itself may be in many forms. In one form it could use a number of albums recorded on media such as a compact disc, with suitable machinery to select the appropriate disc, play a selected track and then return the disc to a suitable storage position. In another form, it could be in the form of a computer linked to a bulk storage device such as a high capacity magnetic or optical drive on which all available tracks are stored. In either case, there will be a system for amplifying and distributing sound and/or video from a track which is being played.

The list from which users select tracks could be a simple printed menu, or a list on a video monitor or other display device. In another arrangement, which can be combined with the use of a list from which a selection is made, there could be interrogation of the jukebox to determine the available tracks. For example a user could send an SMS message in a recognised format to search for records of a particular artist. Thus, the message "? Beatles" could cause the jukebox to look at a catalogue of tracks, find all "Beatles" tracks, and then advise the user of available tracks and a code to select in order to play a particular track. The user could be advised by a return SMS message with the list of tracks and codes, or if a video monitor is provided the list could be displayed to the user. The user will then send back a further SMS message with the code of the selected track.

The jukebox system could include a database of equivalents to enhance the search facility. For example, a search for "John Lennon" could find John Lennon tracks on his own albums, or "Beatles" tracks on which he performs. Thus, the database would include information about performers and their bands. It would also be possible for the database to return "similar" entries. If no records are available by a given artist, tracks of a similar nature may be located.

Such a system for accepting search requests could be used to determine which tracks should be available on the jukebox. In a conventional jukebox, users can only select tracks which are listed. If users can search for specific tracks by name, or for tracks by specific artists or on specific albums, for example, then the information can be stored even if there are no tracks currently available. The stored data could be transmitted electronically to a central location at intervals, for example daily. Analysis can be carried out on the received requests, and decisions reached as to what to do by way of adding tracks to jukeboxes. Trends could be analysed, and different approaches adopted for different locations, whether for specific towns or even particular sites such as a club or bar.

Such information can also be used to send to the jukebox, by electronic means, tracks that are requested but not available at that time. Download times will depend on whether the track is audio only or includes motion video. However, a delay of a minute or two is perfectly acceptable in the context of a jukebox which will be playing other tracks in the meantime. A user requesting an unavailable track may be sent a message, or advised on a monitor, that the track will be available in a few minutes. If a person requests a track which has to be downloaded, that may become available to other users either permanently or for a limited period. If, for example a first track by a particular artist is downloaded and later in the day a second person requests another track by the same artist, that second person may be advised by the system that the first track is also available.

In the preferred arrangements, different locations will have tracks available that have evolved from an initial selection to reflect user preferences at the locations In arrangements using e.g. a cellular network, information can be sent from anywhere and not simply from the location where the tracks are to be played. This can be used so that somebody can request a track and if desired include a greeting, for somebody who is at the location, even though the person making the request is elsewhere. It can also be made possible for a user to interrogate the system to determine the types of track available before deciding whether to visit the location. This could be done in many ways. For example, the user could interrogate a particular location directly or through a central server which has details of a range of locations. The user could browse lists or ask for a list of tracks of a particular type or by a particular artist. This will be used to determine whether or not to visit particular locations.

A user could also seek a list of available locations with jukeboxes in accordance with the present invention. A location request identifying a town, city and so forth, could be made to a central server. Alternatively, means could establish automatically the geographical position of the user and suggest suitable locations in the locality. This can be done using cell identification technology, or by using an integrated global positioning system in a mobile telephone or PDA. It would be possible for a user to ask, for example, for the nearest location where a particular track can be played.

The information transmitted to the jukebox may include a text message, still picture or even a video clip which is extracted from the transmission and displayed to the persons in the public place on a video monitor. The message is preferably displayed or played while the track or tracks requested in the transmission is/are played. This could be via a video monitor or TV monitor of any suitable type. An audio message may also be incorporated into the transmission and this may be extracted and played to the persons in the public place over a loudspeaker. Typically, such messages would be greetings, perhaps dedicating a track to somebody having a birthday. The system may contain software to monitor the use of language that might be found offensive and to block messages containing such language. Persistent abusers of the system could be blocked form accessing the system by reference e.g. to their Caller ID. If a user wishes to keep a message personal, there could be the facility for the SMS message to include the telephone number of the recipient. When the jukebox is about to play, or is playing the requested track, the system could send an SMS message to the recipient. This could if desired be in addition to a publicly displayed message. The system would have suitable means for extracting the appropriate data from an incoming SMS message for carrying out the various additional functions.

Preferably the jukebox transmits information as text, data or speech to the mobile communications device to confirm receipt of the request and/or to advise when the requested track is to be played. There could also be confirmation that a greeting, dedication or other message has been sent to another recipient. Again, all of this could be achieved by means of SMS messaging.

The system may permit data, still pictures and video to be transmitted to users so that it is not essential to view a public monitor. This could be any of the information available on monitors, including a still picture or video clip which has been transmitted by a user when requesting a track, for example for use as a greeting.

Although the requested tracks may be played in the same order as they are requested, preferably the jukebox is adapted to change the order in which the tracks are played if, for example, consecutive requests for the same track are received. There could be a system for notifying users of when it is expected that a track will be played, for example by keeping a "time line" of requested tracks and using data about tracks to delay the length of the tracks and thus the delay until a particular track is played such notification could be by means of SMS messaging also.

The selection of tracks by a mobile communications device such as a mobile telephone facilitates the decoupling of the playback device and thus the likelihood of damage occurring to the jukebox may be reduced. Indeed, only the playback device needs to be installed in the public place to allow the person requesting the track to hear and/or see a track when it is played. The associated receiving and/or processing devices may be located remotely, for example in an office or room not open to the public. As the public do not require direct access to the hardware of the jukebox to request tracks, listings of the tracks available may be distributed throughout the public place on, for example, inexpensive printed or laminated track menus. These menus are small and cheap to produce and can be readily updated or replaced, for example, to include new tracks as they become available. Video monitors could also be provided. These may take any form including conventional cathode ray tube monitors, liquid crystal panels, plasma displays, projectors and any other suitable display device.

The tracks to be played may be stored on any suitable device e.g. CD, DVD or electronic storage device. The storage device may be located remote from the playback device and sent via, for example, a Local Area Network (LAN), Wide Area Network (WAN), dial-up or Asymmetric Digital Subscriber Line (ADSL) upon receipt of instructions from the processing device. The tracks which are made available on the storage device may have come from any source, such as CD, tape, vinyl disc, Moving Picture Experts Group Layer-3 Audio (MP3) and so forth.

Although the jukebox may be operated by coins, or credit or debit cards, the use of a mobile communication device facilitates the charging for playing tracks to be made through the communication device's network charges. Thus, no physical money changes hands and the risk of theft or fraud is reduced.

The charging regime using a mobile telephone, for example, could be standard so that the operator of the jukebox receives no revenue from the jukebox, and relies on the increased volume of trade in the venue. Alternatively, the call could be at a premium rate, so that the jukebox operator enjoys a revenue stream from the telephone network company. Alternatively or additionally, there could be advertising or promotional revenue. Such material could be sent as part of a return SMS message, for example, to a user who has requested a track, or could be displayed using a suitable video monitor or other display device.

In a preferred arrangement, suitable data processing means (such as a personal computer or even an advanced games machine) acts as an audio/visual server, having a video output for driving a public display such a large flat screen monitor. The display can show graphical information content such as the telephone number of the jukebox for requests, the codes needed for particular tracks, details of current tracks playing or selected, and so forth. Simple textual information could be provided, or if desired more complex data. The screen could display motion video of the artists performing tracks, or other suitable accompanying video material, as well as advertising or promotional material as mentioned above.

Mobile telephones may incorporate Caller ID, to provide the identity of the caller. It would be possible to use this information and to display it on a public viewing screen, thus identifying who has chosen a particular track. The screen could also display greetings and dedications as discussed earlier. Caller ID can be used to trigger entries from phone address books. On some mobile telephones, a number can be given an associated name, so that the name of the user will be displayed.

With the increasing bandwidth of mobile communications, further enhancements to the system may be incorporated. Thus, instead of sending a simple SMS text response to a user confirming that a request has been registered, a high quality image, possibly animated, could be incorporated. The same applies to e.g. greetings messages or dedications sent to another recipient when a requested track is to be played.

New generation mobile telephony includes the feature of "always on" connection to the Internet. There is also the Bluetooth protocol which enables permanent communications over short range. Thus it is possible to set up a telephone to indicate permanently a person's preferences. If a user sets up a preference for "George Michael" music, then when a location such as a bar is entered that location will be advised that a George Michael fan is present. In bars where jukeboxes play constantly without requiring payment, a George Michael track could be selected. Another option would be for an SMS or other message in a predetermined format to be sent on request by a user to notify a location of that user's preference profile.

In accordance with a preferred embodiment of the inventive aspects, the system is combined with or integrated in a system for providing audio, video or multimedia content in a public place without the intervention of customers. Such systems are frequently referred to as "background music" systems although in modern bars and clubs the nature of the content and the audio volume at which it is played may be such that, at least at certain times, it is not viewed or listened to in the background. One such system is available from C-Burn Systems Limited in London, UK. The C-Burn system uses a computer and a bulk storage device for music tracks. The computer is programmed to provide a user interface so that the management of a public place such as a club or bar can select the tracks that will be played. The system can automatically create a play list in accordance with various moods that the management wishes to establish, or fit in with, at certain times of the day and indeed on certain days. The style of the tracks, the suitability of tracks to be played close to each other, the volume and so forth can all be selected.

In a preferred embodiment of the present invention, the jukebox consists of such a system which has been provided with hardware and software to receive and act on customer requests also. When a request is received, the requested track is inserted in the play list. In this and other implementations of the inventive aspects, there may be software to prevent the same track being played too often in a particular period. When used with the "background music" system, this will also take into account tracks which are in the basic play list.

Such a combined system emphasises a difference between the preferred implementations of the present inventive aspects and the use of "phone in" requests for tracks to be played on a television channel. The management at a particular location open to the public has control over the complete audio/video/multimedia environment for that location, in terms of the tracks that are played without customer intervention and the tracks that are available for customer selection.

Whether or not there is the "background music" system, management can determine the environment at particular times or in accordance with particular occasions such as a special event or an unexpected party, by controlling not only the audio volume but also tracks which are available for selection at any given time.

References to public places in this specification are intended to distinguish over private use by individuals in their own homes. They do not imply that any member of the public may enter premises and the inventive aspects apply to e.g. clubs with closed membership.

It will be appreciated that the technology permitting users to select tracks to be played on a jukebox could be used also to enable of selection of other items in a particular venue. For example, in a bar a user could have a separate number or a particular format of SMS message to select items from one or more non-jukebox menus, such as a drinks menu or a food menu. The system could accept requests for external services, such as the number of a suitable taxi company. This could be input, for example, as a ?Taxi message. A similar system could be used in other types of establishment such as hotels for a range of services including, for example room service items or "video on demand" movies. Thus, instead of selecting a track from a jukebox in a public place, a user would select a video for viewing in the privacy of his or her room.

A common thread connecting these various possibilities is the use of a general purpose mobile communications device to transmit a message which a user can compose and send in a standard way. That message is interpreted and used to select options for a service such as playing a track, viewing a video, ordering food or drink, or ordering a taxi, for example. Similar ranges of services can be found in some hotels, where guests are provided with a remote control in their rooms to operate a television and to select various options from on-screen menus. By using a general purpose communications device, a user is not tied to a remote control in a room. If, for example, a guest's mobile telephone is registered on a hotel's network at check in, then options could be selected from anywhere in or even adjacent the hotel. Indeed, options could be selected from anywhere. Thus, a guest could order a snack to be waiting in a hotel room on arrival, or on return from an evening at the theatre.

Of course, services can be ordered using normal voice communications or SMS text messaging over a mobile telephone network, or even using e-mail with Internet enabled mobile phones. However, in accordance with an aspect of the present invention, a user makes a selection from a list of options and transmits a code to data processing means, where the code is interpreted by the data processing means to initiate provision of the selected product or service. Internet enabled mobile phones are able to access web sites, and of course products or services can be ordered from such web sites. However, the process can be somewhat cumbersome. It is necessary to select the web site and navigate through pages and options before making a selection. In accordance with this aspect of the invention, a text message containing a code is sent directly to a number for the provider of the product or service.

Thus, viewed from another aspect of the present invention there is provided a system for supplying a product or service to a user from a provider, selected from a range of products or services available from the provider, each product or service having an associated alphanumeric code, wherein the user has a portable communications device adapted for voice and text message communication over a public mobile telephone network, the provider has data processing means which is connected to the public mobile telephone network so as to receive text messages addressed to a provider's telephone number on the network, the user operates the portable communications device to transmit over the network to the provider's telephone number a text message containing the alphanumeric code of a selected product or service, the user's text message is received by the data processing means together with the telephone number of the user's portable communications device, the received text message is analysed by the data processing means to determine the code of the product or service selected by the user, supply of the product or service associated with the code is initiated automatically by the data processing means, and the data processing means automatically transmits a confirmatory text message to the user's portable communications device over the network. The confirmatory message could be a text message or voice message, either human or synthesised.

In a preferred arrangement, the confirmatory message transmitted by the provider's data processing means to the user contains a unique transaction identifier so that when taking receipt the user can identify the product or service as being in accordance with the transaction between the user and the provider. Thus, for example, if a meal is ordered from a fast food outlet the user would be provided with a unique alphanumeric identifier. After an appropriate time to enable preparation of the order, which could be notified to the user in the confirmatory text message or even in a subsequent text message, the user will go to a till, quote or display the identifier, make payment and receive the meal. A reminder text message could be sent if the meal is not collected within a certain time.

A feature of a preferred implementation of the inventive aspects in the context of a jukebox is the ability to query the system using plain text, for example to determine whether there are any tracks available of a particular artist. This can be applied to other fields as noted earlier, for example to find the phone number of a taxi. There are many other possibilities. For example, if a user enters the name of a location such as "Edinburgh", and sends a message to a suitable number, the times of trains could be displayed. Cell information or GPS information could be used to identify the location of the user and thus identify from where the user is travelling. The system could be interactive in real time, even giving the platform number or other information about the next trains.

A preferred feature is the use of free form text rather than fixed options such as "press 1 for trains, press 2 for buses". Preferably, the system will cope with many possible expressions and is not restricted to exact matches. For example, at a burger outlet it might not be necessary to know a specific code for a fish fillet in a bun. The user could insert the trade name for the product such as "Fish O Fun", or just "Fish" to look at the options for fish products, or "Burger" to look at burger options, where the product will be listed, or even "Fish" and "Burger" to go to the product. There could be an equivalent or simile table.

It will be appreciated that references to a "telephone network" do not imply a network of a particular type, such as "Cellnet" or "Vodafone" in the United Kingdom, but to an entire network in which these compatible types are included.

BRIEF DESCRIPTION OF THE DRAWINGS

A preferred embodiment of the present invention will now be described by way of example only and with reference to the accompanying drawings, in which.

DETAILED DESCRIPTION OF THE INVENTION

Figure 1:
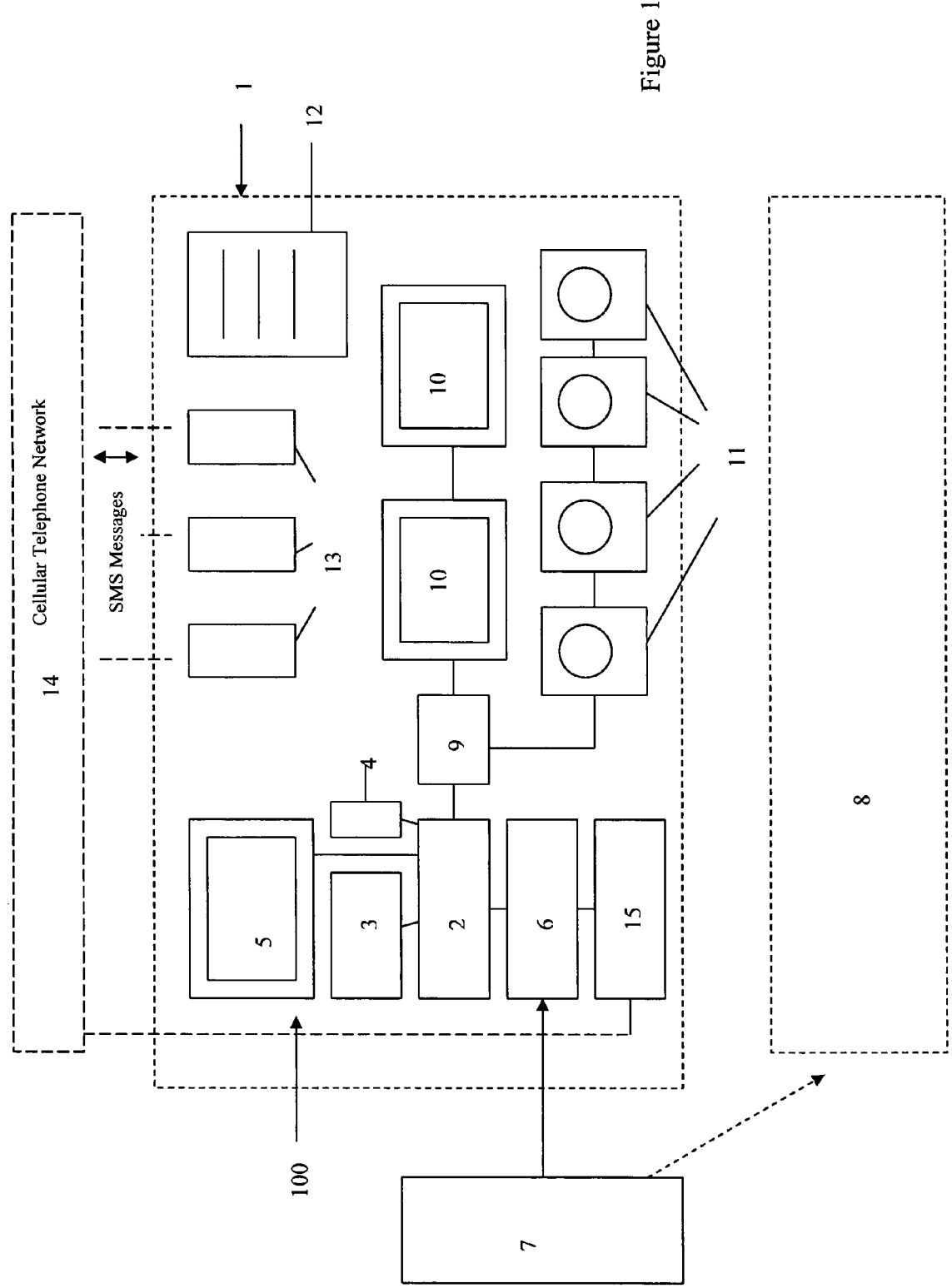
FIG. 1 is a schematic diagram of a system in accordance with the invention.

FIG. 1 shows, diagrammatically a system embodying aspects of the present invention. A site 1, such as a club or bar accessible to members of the public, is provided with a system for providing both background music and jukebox requests. The system includes a personal computer 100 comprising a central processing unit 2, a keyboard 3, mouse 4 and display monitor 5. Interfaced to the central processing unit 2 is a high capacity disk storage unit 6 which stores music tracks in digital form, as well as video and multimedia material as desired. The disc storage unit 6 receives updates from a central location 7 at another site, either via a data connection or in the form of e.g. compact discs carrying data. The central location also supplies other sites such as a club or bar as indicated at 8. The central processing unit is programmed to allow the selection of tracks from the disc storage unit, which are played through an audio visual unit 9 to video monitors 10 and loudspeakers 11 distributed around suitable locations in the site 1.

Software running on the personal computer enables a manager of the site to set up lists of tracks to be played at certain times of day, on certain days and so forth, in accordance with the tastes of the appropriate clientele. These tracks are played automatically to provide "background" music. The system also operates as a jukebox. Around the site 1 are available printed lists 12 of available tracks for selection by customers. Selected tracks from the list are also advertised on the video monitors 10 from time to time. The track information includes the artist, tide and other information as may be desired, together with a unique track identification code. To request a particular track, customers use their own cellular mobile telephones 13. These connect to the cellular telephone network 14, and then to GSM modem 15 which is provided at the site 1 and interfaces with the personal computer.

The customer chooses a track from the printed menu 12 which contains details of each of the available tracks. The customer then enters the discrete track identification code, which corresponds to the selected track, into his mobile telephone handset 13. The code is then sent as an SMS text message to the jukebox GSM modem 15, using a number which is allocated to the site 1. The telephone number may for example be specified on the menu 1 or prominently displayed on signs or on the video monitors at the site 1. The modem 15 transmits the SMS text message to the central processing unit, where the code 2 is processed and the requested track added to the play list so that it will be played.

On the track menu, the track's details, such as the track title and the performing artist, are provided alongside the associated code. The code may be, for example, a four-digit number, although any alpha-numeric code could in practice be used or indeed the track tide and/or artist. Additional information relating to the track may also be provided on the track menu along with details of the album from which the track is taken, for example as a picture of the album cover which is displayed on the video monitors 10.

Having selected a track from the track menu, the customer then composes the SMS text message containing one or more of the identification codes stated on the menu. If a number of tracks are to be selected then the identification codes should be separated by a space. For example, to select Groove Jet/Spiller and Club Tropicana/Wham, the customer might compose a text message containing: "1001 2005". The text message is then sent to the jukebox, i.e. the GSM modem 15 and the personal computer.

The video monitors 10, which are optional for a system in accordance with the invention but are included in this embodiment could be in the form of a television or scrolling LED display. The monitors are provided to allow messages to be displayed, for example to dedicate the requested tracks. The message to be displayed can be enclosed within the SMS text message sent to the jukebox by a customer. Upon receipt of the SMS text message, the jukebox extracts the message and displays it on the monitors. For example, to add a dedication to the track selection identified above, the customer could compose a text message as follows: 1001 2005 # Happy Birthday Debbie, Love Tom#. The dedication "Happy Birthday Debbie, Love Tom" would then be displayed while the requested tracks are playing.

The jukebox can be used either as a free music source or as a conventional jukebox which charges for each track played. In the case in which tracks are to be charged for, the jukebox will send a text message to the mobile telephone 13 from which the original requesting text message was sent. The text message sent by the jukebox is sent at a premium rate and the call charging reversed i.e. the recipient of the text message from the jukebox pays the incurred charges. The providers of the jukebox will then receive payment for playing the requested track through standard arrangements with their mobile telephone network providers. Furthermore, if a track cannot be played by the jukebox for any reason, it will not send an SMS text message to the mobile telephone and, thus, the customer will not be charged for requesting a track which could not be played. Alternatively, if a track cannot be played, the customer could be sent an SMS text message advising them that the track could not be played and this service could be charged at a lower rate.

The interface between the GSM modem 15 and the central processing unit 2 may be, for example, a serial connection using an RS-232 databus. Upon receipt of an SMS text message, the GSM modem converts the SMS text message into an RS-232 serial message consisting of:

1. details of the message sender (e.g. the telephone number of the mobile telephone 13);
2. the time the request is received; and
3. the contents of the SMS text message (i.e. the track code(s) 2 and any messages to be displayed).

Figure 2:
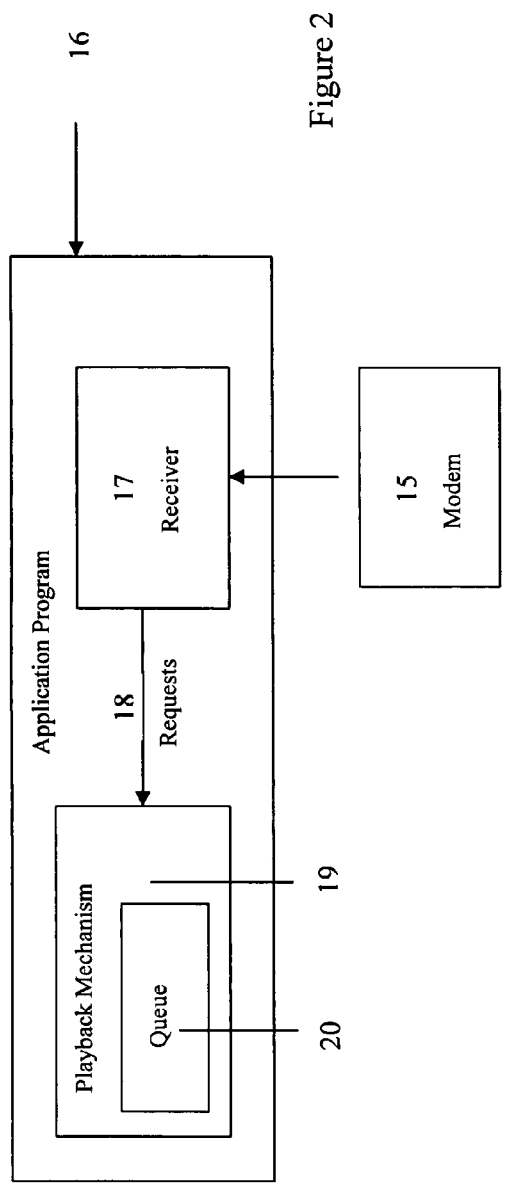
FIG. 2 shows the receiver software components of a jukebox application program.

The software running on the personal computer is PC based Windows 32 bit application software. The software component has a jukebox application program 16, shown schematically in FIG. 2. The application program 16 has a software receiver component 17 which receives the RS-232 serial message from the GSM modem 15. The receiver component 17 processes the RS-232 serial message and determines which tracks are requested in the SMS text message. The receiver component 17 then forwards any track requests 18 to a playback mechanism 19 provided in the application program 16. The playback mechanism 19 has a playback queue 20 which determines the order in which the requested tracks will be played.

Figure 3:
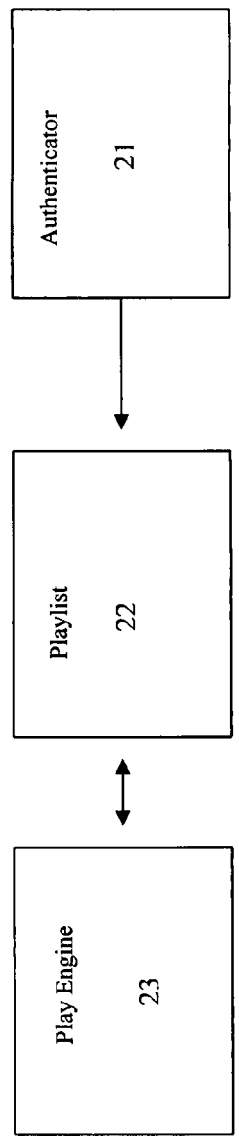
FIG. 3 shows an overview of the playback mechanism of a system in accordance with the present invention.

As shown in FIG. 3, when a track request is received, it must undergo an authentication process by an authenticator 21 provided in the playback mechanism 19 to ensure that (a) the or each track contained in the request is valid and available; (b) the or each track contained in the request is allowed to be played at this time, for example to avoid the same track being placed twice in a row (see below); and (c) any message to be displayed is not offensive, for example it does not contain offensive language.

The conversion of the SMS track request string into a track request identification code is performed in the SMS software receiver component 17 of the jukebox application program. When a track request is processed it is scanned for four-digit track identification request codes. When found these track identification codes are changed into integers installed in a list. For example, the following message: 1002 1003 0193 0007 is converted into a list of integers:
1002
1003
193
7.

Sample Visual Basic code for performing the above conversion is shown below:

table, which matches the track code to an internal system track identification (TrackID) code. An example of the track request lookup table is shown below.

| TrackRequestId | TrackId |
| --- | --- |
| 1002 | 92345 |
| 1003 | 94563 |
| 1004 | 98111 |
| 1005 | 95337 |

Returning to the example given above, when the request is mapped using the above trackrequestlookup table the following internal track identification (TrackID) codes would be produced:

92345 (from 1002)

94563 (from 1003).

```
'*** extract a list of track request ids from a text message ***
Public Function extractTrackRequestIdsFromMsg(ByVal smsMsg As String, ByRef trackRequestIdList As
RevIntList) as long
    'empty the list
    trackRequestIdList.empty( )
    'now extract the track request ids from the string
    Dim i As Integer
    'iterate through the string by splitting into into " " delimited tokens
    For i = LBound(Split(smsMsg, " ")) To UBound(Split(smsMsg, " "))
        Dim tokenStr As String
        'get the current token
        tokenStr = Split(smsMsg, " ")(i)
        'now try and convert the token to a number
        Dim trackRequestId As Integer
        trackRequestId = val(tokenStr)
        'now if the token was a number of form "1234" then
            'trackRequestId will be greater than 0
        If trackRequestId > 0 Then
            'got a valid track request id so add it to the list
            trackRequestIdList.Add (trackRequestId)
        End If
    Next
    'finally return the number of track request ids we found
    extractTrackRequestIdsFromMsg = trackRequestIdList.Count( )
End Sub
```

Next, the venue specific track identification codes, as shown on the track menu, are converted into the internal track identification codes used by the jukebox. This mapping of the track request identification codes to the internal track identification code uses a track request lookup table in the jukebox's database. The track request lookup table is a lookup The codes 193 and 7 are ignored by the authenticator 21 as they do not map to internal track identification codes in the trackrequestId table. Sample Visual Basic code to perform the above mapping sequence is shown below:

```
'*** map from track Request IDs to actual Revolution track Ids ***
Public Sub mapTrackRequestIdToTrackId(ByRef trackRequestIdList As RevIntList, _
                ByRef trackIdList As RevIntList)
    'check we actually have tracks to process
    If trackRequestIdList.Count( ) > 0 Then
        'empty our list of track IDs we find
        trackIdList.empty( )
        Dim conn As New DbConnector
        'connect to our database
        conn.connect (clientDbName_)
        If conn.connected( ) Then
            Dim i As Long
            'iterate through each trackRequestId
            For i = 0 To trackRequestIdList.Count( ) – 1
                'build a SQL query so see trackRequestId maps to a track id
                Dim queryStr As String
                queryStr = " SELECT TrackRequestLookup.TrackRequestId,
                            TrackRequestLookup.TrackId" & _
                        " From TrackRequestLookup " & _
                        " WHERE (((TrackRequestLookup.TrackRequestId)=" & _
                        str(trackRequestIdList.value(i)& "));              " 'now open a SQL record set
                conn.openRecordSet (queryStr)
                If conn.recordSetOpen( ) Then
                    'now see if the query returned any records
                    'i.e was there a corresponding track ID
                    If conn.rs.EOF = False Then
                        'yes the was a map so add the resultant track id to our
                            list
                        trackIdList.Add (conn.rs!trackId)
                    End If
                    'clean up
                    conn.closeRecordSet
                End If
            Next
            'clean up
            conn.disconnect
        End If
    End If
End Sub
```

The track request authenticator 21 also determines whether particular tracks are allowed to be played at a given time, for example to avoid the same track being played twice in a row. Thus, although the jukebox aims to provide a continuous stream of customer track requests, it also aims to ensure that the music player does not become irritating through excessive repetition of one or more tracks or artists. If a conflict is found, the scheduling mechanism will then attempt to resolve this by delaying playback of conflicting tracks for as long as possible, either by inserting other customer requests into the playlist or by inserting its own tracks.

The authentication process consists of a number of checks, as follows:

1. Will adding track to the end of the Playlist result in the same track being played twice within a given time period (usually 15 minutes).

YES: Add track request to delayed request queue

NO: Proceed to the next check

2. Will adding a track to the end of the Playlist result in the same artist being played twice in a row.

YES: Add track request to delayed request queue

NO: Proceed to the next check

3. Does the track have the same name as the previous track? (for cover versions of tracks)

YES: Add track request to delayed request queue

NO: Add track request to the end of the Playlist for later playing.

Sample Visual Basic code for performing these request check is shown below:

```
'*** authenticate track a track request ***
Public Sub authenticateTrack(
        ByVal trackId As Long, _
            ByVal customerPhoneNumber As String, _
            ByVal dedication As String)
    Dim trackAdded As Boolean
    trackAdded = False
    'check to see if adding track to playlist will result in it being played to recently
    If willTrackBePlayedTooClose(trackId, DEFAULT_GAP_BETWEEN_SAME_Track) = False Then
        'that was okay so check if the adding the track will result in the same artist being
        'played twice in a row
        If willArtistBePlayedTwiceInARow(trackId) = False Then
            'check that the track name is not the same as the last one (check for cover versions)
```

```
            If UCase$(getTrackName(trackId)) <> UCase$(getTrackName(thePlayList.lastTrackId( ))) Then
                thePlayList.addTrackFromCustomer(trackId,customerPhoneNumber,dedication)
                'flag that the track was add to the playlist and doesn't have to be delayed
                True
            End If
        End If
    End If
    'check to see if the track was added
    If trackAdded = False Then
        'track wasn't added because it failed one of the check so add the request to the delayed track list
        delayedTrackList_.add(trackId,customerPhoneNumber,dedication)
    End If
End Sub
```

The jukebox playback mechanism is based around a playlist of tracks to be played sequentially. As each track request is authenticated it is added to the end of the playback queue. The play engine software then plays the tracks sequentially.

As shown in FIG. 3, the track request authenticator 21 receives the track request and determines whether it is valid, as described above. If the request is valid, the authenticator adds it to a playlist 22 and the playlist holds the tracks in the order they were requested. A play engine 23 sends the audio (and/or video or multimedia) signals to the A/V unit 9 and as each track ends the play engine requests the next track from the playlist 22.

Just before a requested track begins to play, the jukebox composes a SMS text message confirming that the track is about to be played. The SMS text message is sent via "reverse billing" so that the recipient is charged for the track, as described above. The confirmatory SMS text message for each track may contain one or more of the following:
  the track request identification code as originally input by the customer;
  the name of the track and/or artist in text form;
  suggestions of one or more other tracks that the customer may like;
  an option to buy the album that the track is taken from, for example via a WAP site;
  a short text advert; or
  an optional prize, such as free credit to promote use of the jukebox.

Sample Visual Basic code to send the customer an SMS text message is shown below:

```
'*** send a confirmation that a track is about to play to the customer that requested it ***
Public Sub sendConfirmation(ByVal trackId As Long, ByVal customerPhoneNumber As String)
    Dim confirmationStr As String
    'compose confirmation
    confirmationStr = "Thank you using Revolution Jukebox. Your track ID:" & _
        str(mapTrackIdToRequestTrackId(trackId)) & "."
    'suggest similar track to customer
    Dim suggestedTrackId As Long
    suggestedTrackId = getTrackSuggestiong(trackId)
    confirmationStr = confirmationStr & "Have you heard track ID: " & _
        str(mapTrackIdToRequestTrackId(trackId)) & "? " * _
        "We think you might like it. "
    'finally work out whether we're sending the user a free credit
    'prize or displaying an advert
    If hasCustomerWonPrize(customerPhoneNumber) Then
        'customer has won prize so tell them
        confirmationStr = confirmationStr & "Congratulations. You've won a free credit!!!"
    Else
        'no prize so display an advert
        confirmationStr = confirmationStr & generateAdvert(customerPhoneNumber)
    End If
    'finally actually send the confirmation through the SMS manager
    smsManager_.sendConfirmation(confirmationStr,customerPhoneNumber)
End Sub
```

If the initial SMS text message also contains a message, such as a dedication for the requested track, the message is displayed on a scrolling LED display, PC monitor, television overlay device or other suitable display means. The extraction of the message from the SMS text message is similar to the method used for extracting the track identification codes from the message, as described above. However, the message may advantageously be placed inside of parenthesis or # symbols as shown in the above example to more readily facilitate its extraction. The message may also be scanned for offensive words and, if detected, the message may be amended to filter out the offensive words or not displayed and an SMS text message to this effect sent to the mobile telephone from which the request was sent.

If there are no current requests in the play list, then the jukebox will revert to the standard "background music" list.

It will be evident to the person skilled in the art that a number of modifications may be made to the jukebox system described herein without departing from some aspects of the present invention. For example, a track request may be sent by means other than SMS text messaging, for example over the Internet via WAP enabled telephones, Bluetooth, and so on. Furthermore, the GSM modem which receives the initial SMS text messaging, although connected to the jukebox, may be located remotely from the play engine and the sound system which plays the tracks. Furthermore, the tracks may be stored remotely from the public place and sent to the playback means for example as dial-up or ADSL.

Although the SMS text messaging system has been described herein for playing tracks on a jukebox, it will be appreciated that it may also be used in other situations, for example to order food in takeaways and restaurants. In such a case, data processing means receiving the text message ordering a meal could be interfaced with an ordering system that is associated with terminals where direct orders are taken from customers in a conventional manner, so that messages are displayed to food preparation operatives to commence preparation of required meal components.

What is claimed is:

1. A computer-implemented method for selecting and playing audio and/or video tracks on a jukebox apparatus situated at a public place, the jukebox apparatus being adapted to register requests for tracks to be played and to store the requests while other requested tracks are played, the jukebox apparatus having a public display visible at the public place, the method comprising:

establishing a communication channel between the jukebox apparatus and a mobile telephone;

constructing a request message with alphanumeric characters on the mobile telephone, the request message comprising:

an identification code for a track that is being requested to be played on the jukebox apparatus, and a dedication word to be displayed on the public display of the jukebox apparatus in association with playing of the requested track;

transmitting the request message from the mobile telephone to the jukebox apparatus over the communication channel, the request message being transmitted as a Short Message Service (SMS) text request message;

receiving and automatically scanning the SMS text request message at the jukebox apparatus to identify the identification code for the requested track and the dedication word;

automatically authenticating and processing the identification code to provide data instructions to register the request for the track in the jukebox apparatus;

constructing a confirmation message with alphanumeric characters on the jukebox apparatus to confirm that the request has been registered;

transmitting the confirmation message from the jukebox apparatus to the mobile telephone over the communication channel as an SMS text confirmation message;

playing the requested track in the public place using the jukebox apparatus; and displaying the dedication word on the public display of the jukebox apparatus in association with the playing of the requested track;

wherein prior to constructing and transmitting the request message:

constructing a search message with alphanumeric characters on the mobile telephone, the search message comprising a search criterion regarding tracks available on the jukebox apparatus;

transmitting the search message from the mobile telephone to the jukebox apparatus over the communication channel, the search message being transmitted as an SMS text search message;

receiving and automatically scanning the SMS text search message at the jukebox apparatus to identify the search criterion;

searching for a track available on the jukebox apparatus that meets the search criterion; constructing a search response message with alphanumeric characters on the jukebox apparatus, the search response message comprising a name and an identification code of the track meeting the search criterion; and transmitting the search response message from the jukebox apparatus to the mobile telephone over the communication channel, the search response message being transmitted as an SMS text search response message.

2. A computer-implemented method for selecting and playing audio and/or video tracks on a jukebox apparatus situated at a public place, the jukebox apparatus being adapted to register requests for tracks to be played and to store the requests while other requested tracks are played, the jukebox apparatus having a public display visible at the public place, the method comprising:

establishing a communication channel between the jukebox apparatus and a mobile telephone;

constructing a search message with alphanumeric characters on the mobile telephone, the search message comprising a search criterion regarding tracks available on the jukebox apparatus;

transmitting the search message from the mobile telephone to the jukebox apparatus over the communication channel, the search message being transmitted as an SMS text search message;

receiving and automatically scanning the SMS text search message at the jukebox apparatus to identify the search criterion searching for a track available on the jukebox apparatus that meets the search criterion; constructing a search response message with alphanumeric characters on the jukebox apparatus, the search response message comprising a name and an identification code of the track meeting the search criterion;

transmitting the search response message from the jukebox apparatus to the mobile telephone over the communication channel, the search response message being transmitted as an SMS text search response message;

constructing a request message with alphanumeric characters on the mobile telephone, the request message comprising the identification code for the track that is being requested to be played on the jukebox apparatus, the track selected from the search response message, transmitting the request message from the mobile telephone to the jukebox apparatus over the communication channel, the request message being transmitted as an SMS text request message;

receiving and automatically scanning the SMS text request message at the jukebox apparatus to identify the identification code for the requested track;

automatically authenticating and processing the identification code to provide data instructions to register the request for the track in the jukebox apparatus;

constructing a confirmation message with alphanumeric characters on the jukebox apparatus to confirm that the request has been registered;

transmitting the confirmation message from the jukebox apparatus to the mobile telephone over the communication channel as an SMS text confirmation message; and playing the requested track in the public place using the jukebox apparatus.

3. The method of claim 2, wherein the request message further comprises a dedication word to be displayed on the public display in association with the playing of the requested track, and wherein the method further comprises:

automatically scanning the SMS text request message at the jukebox apparatus to identify the dedication word; and displaying the dedication word on the public display of the jukebox apparatus in association with the playing of the requested track.

4. A computer-implemented method for selecting and playing audio and/or video tracks on a jukebox apparatus situated at a public place, the jukebox apparatus being adapted to register requests for tracks to be played and to store the requests while other requested tracks are played, the jukebox apparatus having a public display visible at the public place, the method comprising:

establishing a communication channel between the jukebox apparatus and a mobile telephone;

constructing a request message with alphanumeric characters on the mobile telephone, the request message comprising an identification code for a track that is being requested to be played on the jukebox apparatus;

transmitting the request message from the mobile telephone to the jukebox apparatus over the communication channel, the request message being transmitted as an SMS text request message;

receiving and automatically scanning the SMS text request message at the jukebox apparatus to identify the identification code for the requested track;

automatically authenticating and processing the identification code to provide data instructions to register the request for the track in the jukebox apparatus;

constructing a confirmation message with alphanumeric characters on the jukebox apparatus to confirm that the request has been registered;

transmitting the confirmation message from the jukebox apparatus to the mobile telephone over the communication channel as an SMS text confirmation message; and playing the requested track in the public place using the jukebox apparatus.

* * * * *